United States Patent
Sanders

(10) Patent No.: US 7,947,069 B2
(45) Date of Patent: May 24, 2011

(54) MEDICAL DEVICES COMPRISING SMALL FIBER BIOMATERIALS, AND METHODS OF USE

(75) Inventor: Joan E. Sanders, Kirkland, WA (US)

(73) Assignee: University of Washington, Seattle, WA (US)

(*) Notice: Subject to any disclaimer, the term of this patent is extended or adjusted under 35 U.S.C. 154(b) by 0 days.

(21) Appl. No.: 10/316,988

(22) Filed: Dec. 10, 2002

(65) Prior Publication Data

US 2003/0171053 A1 Sep. 11, 2003

Related U.S. Application Data

(63) Continuation of application No. 09/721,615, filed on Nov. 22, 2000, now abandoned.

(60) Provisional application No. 60/167,540, filed on Nov. 24, 1999.

(51) Int. Cl.
*A61F 2/06* (2006.01)
*D04H 3/03* (2006.01)

(52) U.S. Cl. ........... 623/1.1; 623/1.15; 623/2.1; 442/50; 442/340; 442/351; 428/316.6; 428/311.11; 428/311.51; 428/315.7; 428/364

(58) Field of Classification Search .................. 428/399, 428/310.5, 311.11, 315.7, 364, 316.6; 442/340, 442/2, 5, 50, 341, 345, 351; 623/1.1, 1.15, 623/2.1
See application file for complete search history.

(56) References Cited

U.S. PATENT DOCUMENTS

| | | | |
|---|---|---|---|
| 4,082,893 A | | 4/1978 | Okita |
| 4,164,045 A * | | 8/1979 | Bokros et al. ............... 623/1.28 |
| 4,340,091 A * | | 7/1982 | Skelton et al. ............ 139/383 R |
| 4,474,851 A * | | 10/1984 | Urry ............................. 428/373 |
| 4,475,972 A * | | 10/1984 | Wong ............................ 156/167 |
| 4,642,119 A * | | 2/1987 | Shah ........................... 623/13.2 |
| 4,965,110 A * | | 10/1990 | Berry ........................... 428/36.4 |
| 5,002,583 A * | | 3/1991 | Pitaru et al. ............... 623/11.11 |
| 5,171,273 A * | | 12/1992 | Silver et al. ................ 623/13.11 |
| 5,219,326 A | | 6/1993 | Hattler |
| 5,266,476 A * | | 11/1993 | Sussman et al. .............. 435/399 |
| 5,336,256 A * | | 8/1994 | Urry ............................ 623/1.44 |
| 5,385,580 A * | | 1/1995 | Schmitt ....................... 623/1.52 |
| 5,531,998 A * | | 7/1996 | Mares et al. .................. 424/426 |
| 5,584,877 A | | 12/1996 | Miyake et al. |
| 5,629,186 A * | | 5/1997 | Yasukawa et al. ............ 435/177 |
| 5,653,747 A * | | 8/1997 | Dereume ..................... 623/1.54 |
| 5,679,299 A * | | 10/1997 | Gilbert et al. ................ 264/103 |
| 5,718,159 A * | | 2/1998 | Thompson ....................... 87/33 |
| 5,733,337 A * | | 3/1998 | Carr et al. .................... 435/325 |
| 5,741,330 A | | 4/1998 | Brauker et al. |
| 5,800,529 A | | 9/1998 | Brauker et al. |
| 5,849,036 A * | | 12/1998 | Zarate .......................... 623/1.31 |
| 5,882,354 A | | 3/1999 | Brauker et al. |
| 5,997,895 A * | | 12/1999 | Narotam et al. .............. 424/423 |
| 6,165,217 A * | | 12/2000 | Hayes ........................ 623/11.11 |
| 6,306,491 B1 | | 10/2001 | Kram et al. |
| 6,511,511 B1 * | | 1/2003 | Slivka et al. ............... 623/23.75 |

* cited by examiner

*Primary Examiner* — Hai Vo

(57) ABSTRACT

In one aspect the present invention provides medical devices 10 that each include a plurality of fibers 22, substantially all of the plurality of fibers 22 each including a portion having a maximum diameter of at least five micrometers, wherein substantially all of fibers 22 form a layer on at least one external surface of medical device 10. In another aspect, the present invention provides methods of manufacturing medical devices 10, the methods including the steps of: (a) applying a layer comprising a plurality of fibers 22 to at least one surface of medical device 10; and (b) matching the value of the Young's modulus of the layer to +/−35% (in some embodiments to +/−20%) of the value of the Young's modulus of an animal tissue.

20 Claims, 8 Drawing Sheets ated under 35 U.S.C. §§120 and 119,
MEDICAL DEVICES COMPRISING SMALL FIBER BIOMATERIALS, AND METHODS OF USE

CROSS-REFERENCES TO RELATED APPLICATIONS

This application is a continuation of application Ser. No. 09/721,615, filed Nov. 22, 2000, now abandoned which claims the benefit of U.S. Provisional Patent Application No. 60/167,540, filed Nov. 24, 1999, priority from the filing dates of which is hereby claimed under 35 U.S.C. §§120 and 119, respectively.

GOVERNMENT RIGHTS

This invention was made with government support under Grant No. EEC-9229161 awarded by the National Science Foundation. The government has certain rights in the invention.

FIELD OF THE INVENTION

This application relates to medical devices that are adapted for implantation into an animal body. In particular, this invention relates to implantable medical devices that elicit a reduced foreign body reaction from the host tissue.

BACKGROUND OF THE INVENTION

A limiting factor associated with the use in animals, such as humans, of implantable medical devices such as heart valves, hip joints, vascular grafts, skin substitutes and implantable biosensors, is the foreign body reaction of the tissues to the materials used to fabricate the medical device. Despite decades of biomaterial research and development, these difficulties with biocompatibility hinder the life span and effectiveness of implanted medical devices.

The foreign body reaction results from an inflammatory reaction to the implanted medical device which initiates a cascade of cellular events, culminating in the formation of a fibrous capsule which isolates the medical device from the vascular system in the tissue. The lack of vascular communication leads to the tissue attempting to eliminate the implanted medical device by encapsulation. This reaction eventually destroys the utility of the implant.

It is known that macrophages play a central role in the foreign body reaction by initiating a cascade of cellular activity that culminates in either a state of chronic inflammation or complete encapsulation of the implanted device. An early indicator of this reaction is the appearance of fused cells known as giant cells, which are multinucleate syncytia formed by the fusion of macrophages that have been directed towards an inflammatory site. The giant cells initiate a pleiotropic pathway leading to the surrounding tissue forming a fibrous capsule, composed primarily of fibroblasts and collagen, which isolates the implanted material from the blood supply.

The present invention provides medical devices, and methods for their manufacture, that elicit a reduced foreign body reaction, or do not elicit any foreign body reaction, when implanted into an animal body.

SUMMARY OF THE INVENTION

In accordance with the foregoing, in one aspect the present invention provides medical devices that each include a plurality of fibers, substantially all of the plurality of fibers each including a portion having a maximum diameter of at least five micrometers (in some embodiments at least six micrometers, or at least 7 micrometers, or at least 10 micrometers, or at least 15 micrometers), wherein substantially all of the fibers form a layer on at least one external surface of the medical device. In some embodiments, the fiber portion having a maximum diameter of at least five micrometers (in some embodiments at least six micrometers, or at least 7 micrometers, or at least 10 micrometers, or at least 15 micrometers) extends for greater than 75% of the length of the fiber, or for greater than 90% of the length of the fiber, or for greater than 98% of the length of the fiber. In other embodiments, each fiber of the plurality of fibers includes at least two portions each having a maximum diameter of at least five micrometers (in some embodiments at least six micrometers, or at least 7 micrometers, or at least 10 micrometers, or at least 15 micrometers), wherein the at least two portions cumulatively extend for greater than 75% of the length of the fiber (or for greater than 90% of the length of the fiber, or for greater than 98% of the length of the fiber).

In some embodiments of the medical devices of the invention, the fiber layer is a mesh. The medical devices of the invention can also include multiple layers of fibers disposed on at least one external surface of the medical device. The plurality of fibers included in the mesh can include a mixture of fibers made from different materials, and/or a gradient of fiber diameters (such as a gradient that includes a maximum fiber diameter and a minimum fiber diameter and at least 75% of fibers possessing the maximum diameter are disposed adjacent to the medical device external surface). Typically, the layer of fibers disposed on at least one external surface of a medical device of the invention has a Young's modulus of no more than 1.00 GigaPascals (GPa) (in some embodiments, the Young's modulus is no more than 0.5 GPa.). The layer of fibers disposed on at least one external surface of a medical device of the invention can include pores defined by the fibers. In some embodiments, the pores have a mean diameter of between 10 μm and 120 μm (such as between 50 μm and 100 μm).

In another aspect, the present invention provides methods of manufacturing a medical device, the methods including the steps of: (a) applying a layer comprising a plurality of fibers to at least one surface of a medical device; and (b) matching the value of the Young's modulus of the layer to +/−35% (in some embodiments to +/−20%) of the value of the Young's modulus of an animal tissue. Typically, the value of the Young's modulus of soft animal tissue (e.g., skin, blood vessels or muscle) is no greater than 1.0 GPa. Typically, the value of the Young's modulus of bone is greater than 1.0 GPa.

The medical devices of the invention are useful, for example, for diagnosing, treating and/or ameliorating one or more symptoms of one or more diseases that afflict animal cells and tissues. In particular, the medical devices of the invention elicit a reduced foreign body reaction compared to medical devices that are identical to the medical devices of the present invention except that they do not include a layer of fibers on at least one external surface, as described herein. The methods of the invention are useful, for example, for making the medical devices of the invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In one embodiment, the present invention provides medical devices comprising a plurality of fibers, substantially all of the plurality of fibers each comprising a portion having a maximum diameter of at least five micrometers ($\mu m$), wherein substantially all of the fibers form a layer on at least one external surface of the medical device.

As used herein, the term "a medical device", and grammatical equivalents thereof, encompasses two types of device: (a) a device that is completely or partially implanted into an animal body (such as a human body) during the course of normal operation of the device; and (b) a device that is used as a framework upon which to grow animal cells and/or tissues either in vivo or ex vivo.

As used herein, the term "substantially all of said plurality of fibers have a maximum diameter of at least", and grammatical equivalents thereof, means at least 75% of the fibers that constitute the plurality of fibers each have a diameter that is at least equal to a specified value (such as 5 $\mu m$).

As used herein, the term "maximum diameter" means the longest straight line segment that passes through the center, or centroid (in the case of a fiber having a cross-section that lacks a center), of the cross-section of a fiber and terminates at the periphery of the cross-section, the fiber cross-section being perpendicular to the longitudinal axis of the fiber. The centroid is the "center of area" of a given figure, i.e., given a figure in the plane, the "center of area" is the center of mass of a uniform or homogeneous plate having the same boundaries as the given figure. The "center of mass" is the point in a body which moves as though the body's entire mass were concentrated there, and as though all forces were applied there.

A method to find "center of mass" is as follows: (1) from a sheet of cardboard cut out the desired figure; (2) suspend the figure at some point, p1, with a small nail and hang a plumb line; (3) when the plumb bob is stable, put a penciled mark under the line at the lower part of the figure; (4) remove the nail and, with a pencil, draw a line between the nail hole and the mark; (5) choose another point, p2, and repeat steps 2, 3 and 4. The "center of mass" is the point where the two lines intersect.

As used herein, the term "Young's modulus" refers to a numerical constant that describes the elastic properties of a solid undergoing tension or compression in only one direction. Young's modulus is the slope of the linear region of the stress-strain diagram and is described, for example, in Timoshenko, S. P. and Gere, J. M.: *Mechanics of Materials*. New York, D. Van Nostrand Company (1972), which publication is incorporated herein by reference.

Figure 1:
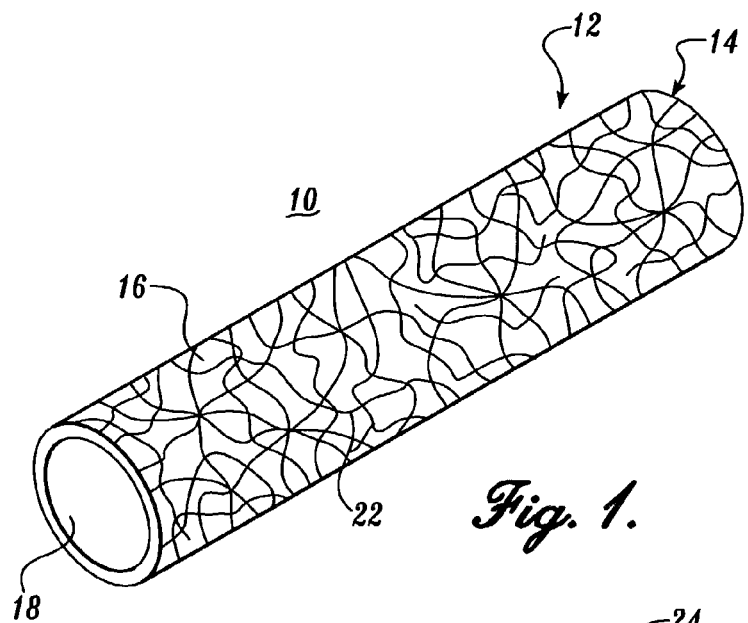
FIG. 1 shows a perspective view of an artificial blood vessel of the invention.
Figure 3:
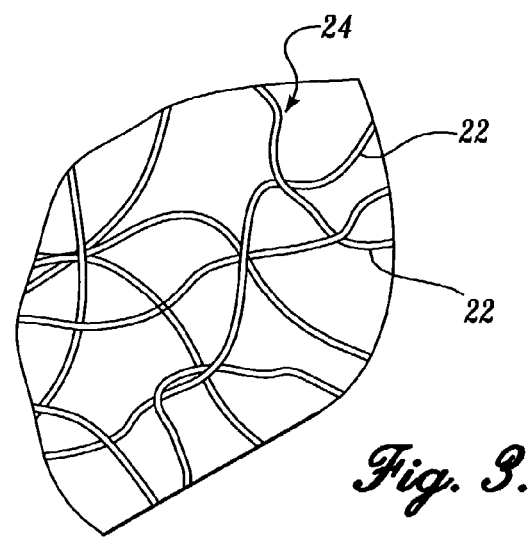
FIG. 3 shows a view of the fibrous mesh located on the surface of the artificial blood vessel of FIG. 1.
Figure 2:
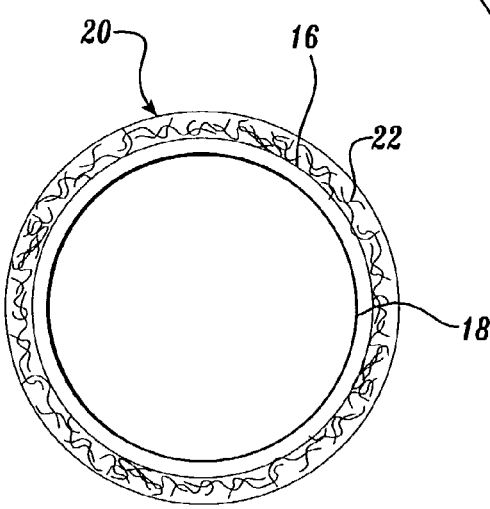
FIG. 2 shows a cross-section of the artificial blood vessel of FIG. 1, the plane of the cross section being perpendicular to the longitudinal axis of the artificial blood vessel.

FIG. 1 shows one embodiment of a medical device 10 of the present invention in the form of an artificial blood vessel 12 comprising a body 14 defining all outer surface 16 and an inner surface 18. As shown more clearly in FIG. 2, which shows a transverse cross-section of artificial blood vessel 12 (the cross-section made perpendicular to the long axis of vessel 12), disposed upon outer surface 16 is a layer 20 composed of a plurality of fibers 22. As shown more clearly in FIG. 3, fibers 22 form a mesh 24 within layer 20 within which individual fibers 22 are randomly oriented with respect to each other. In operation, artificial blood vessel 12 is implanted into an animal body. Typically the value of the Young's modulus of layer 20 is less than 1.0 GPa and is within about plus or minus 35% of the value of the Young's modulus of the tissue surrounding artificial blood vessel 12 after implantation. It is an unexpected property of medical devices 10, including layer 20, that they stimulate a reduced foreign body reaction (or fail to elicit a foreign body reaction) when implanted within an animal body.

Figure 4:
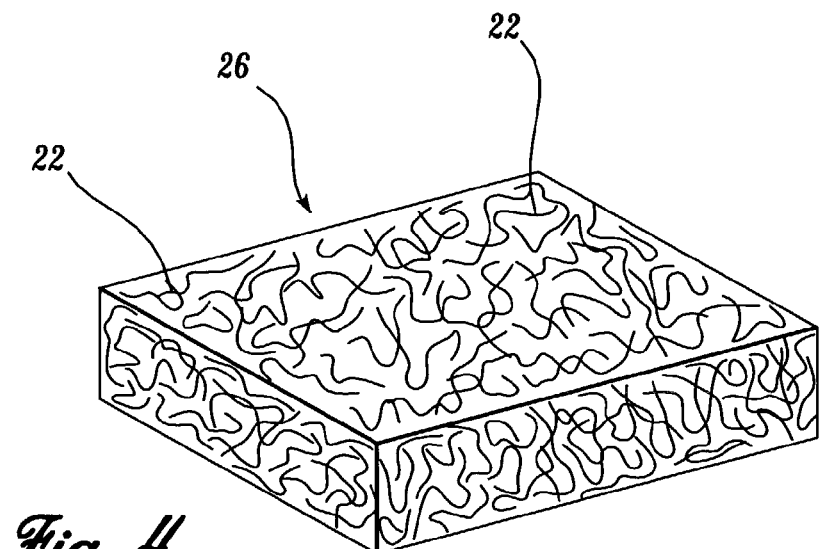
FIG. 4 shows a fiber layer in the form of a three-dimensional fibrous matrix.
Figure 5A:
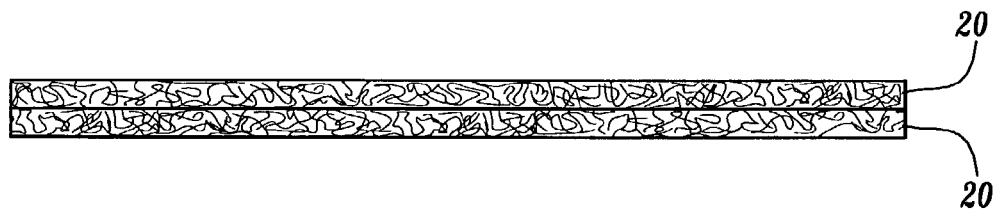
FIG. 5A shows a cross-section of two layers of fibers superimposed one upon the other.
Figure 5B:
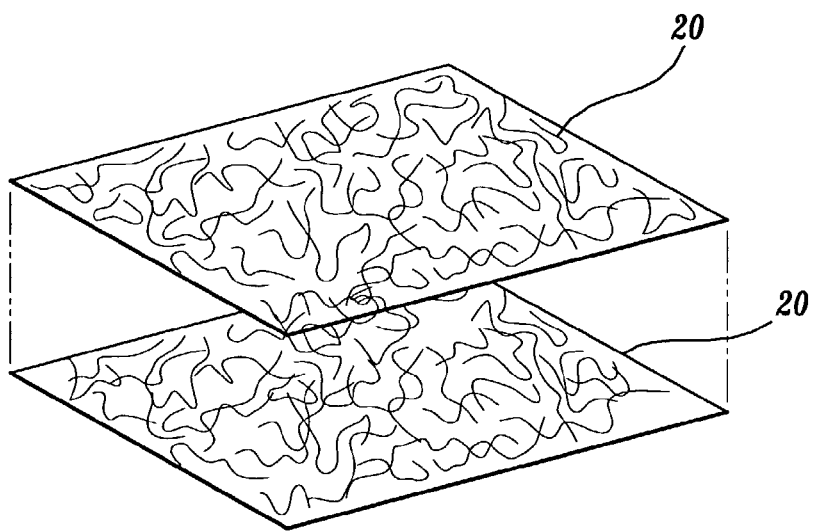
FIG. 5B shows an exploded view of two fiber layers superimposed one upon the other.

In general, fibers 22 can be formed into any desired arrangement within layer 20. Thus, for example, in the embodiment shown in FIGS. 1 and 2, fibers 22 form mesh 24 within which fibers 22 are randomly oriented with respect to each other. In the representative embodiment shown in FIG. 4, fibers 22 form a three dimensional matrix 26. Some medical devices 10 of the invention include two or more layers 20, superimposed one upon the other, as shown in the representative embodiment of FIG. 5A (which shows a cross-section of two layers 20 of fibers 22 superimposed one upon the other) and FIG. 5B (which shows an exploded view of two layers 20 superimposed one upon the other).

Figure 6:
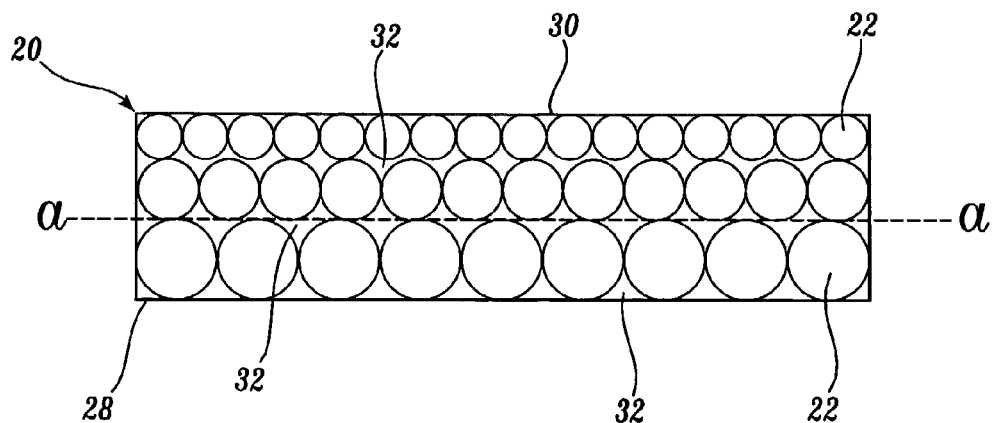
FIG. 6 shows a cross section of a fiber layer that includes fibers of different diameters that are arranged to provide a gradient of fiber diameters within the fiber layer.

In other embodiments, layer 20 includes fibers 22 of different diameters arranged to provide a gradient of fiber diameters. Thus, in the cross-section of the representative embodiment of layer 20 shown in FIG. 6, layer 20 includes a first surface 28 and a second surface 30. Fibers 22 between first surface 28 and second surface 30 form a gradient of fiber diameter in which fiber diameter decreases from first surface 28 to second surface 30. Thus, fibers 22 closest to first surface 28 have the largest diameter, while fibers 22 closest to second surface 30 have the smallest diameter. Further, in the embodiment shown in FIG. 6, fibers 22 define a plurality of pores 32 which typically have a mean diameter of from 10 µm to 120 µm (such as from 50 µm to 100 µm). Mean pore diameter is determined by measuring the diameter of a representative number of pores 32 in one horizontal plane through layer 20, such as the plane a—a shown in FIG. 6. Pore diameter can be measured by any art-recognized method, such as the use optical imaging of multiple cross-sections followed by image processing, or by a "bubble point test" in which a fluid (air or liquid) with known properties at a known pressure is forced through a cross-section of layer 20, the time and pressure required to do so assessed, and the porosity calculated using an analytical model of layer 20.

Figures 7A, 7B:
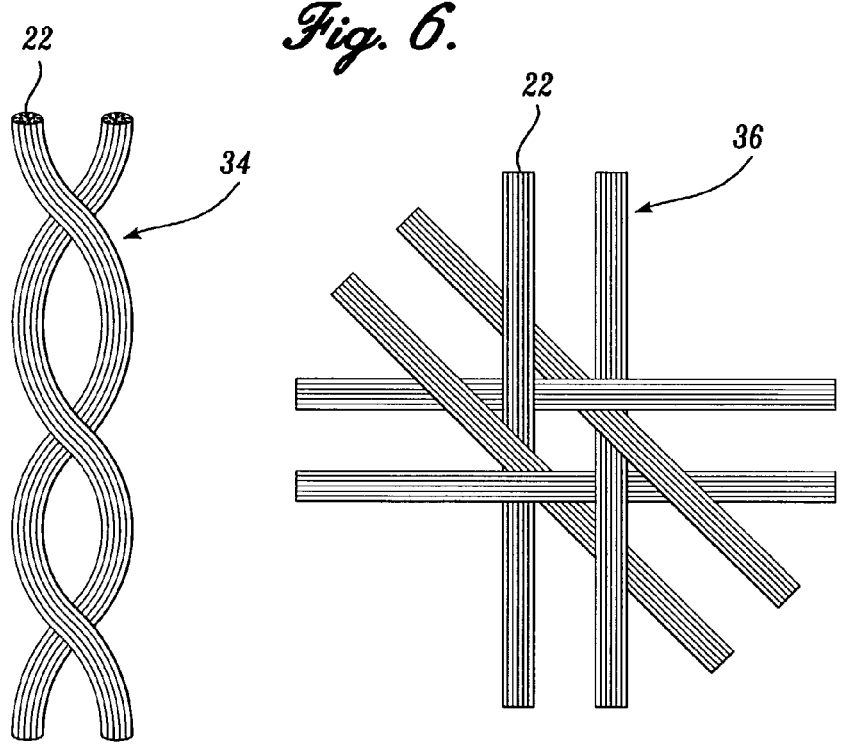
FIG. 7A shows braided fibers useful in the practice of the present invention.
FIG. 7B shows triaxially woven fibers useful in the practice of the present invention.
Figure 7C:
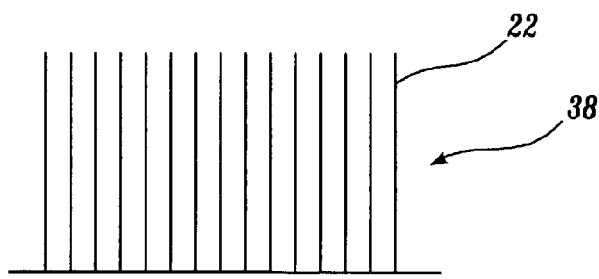
FIG. 7C shows felted fibers useful in the practice of the present invention.

In some embodiments, fibers 22 are oriented in a non-random manner, such as aligned in parallel, or oriented at a defined angle with respect to adjacent fibers. Representative examples of fiber 22 configurations within layer 20 are shown in FIG. 7 and include braided fibers 34 (FIG. 7A), triaxially woven fibers 36 (FIG. 7B) and felted fibers 38 (FIG. 7C). The thickness of layer 20 will depend on such factors as the diameter of fibers 22, but is not less than 5 µm. In embodiments of medical device 10 that include several layers 20, superimposed one upon the other, the thickness of superimposed layers 20 can be several millimeters, for example, up to about 1 cm.

Layer 20 can be deposited directly onto medical device 10, or can be formed separately and then attached to medical device 10, for example by using an adhesive. Representative examples of methods for attaching layer 20 to medical device 10 include: physioadsorption; lamination with adhesives or heat fusion; electrocharging; static adhesion; "close encapsulation" by wrapping the mesh tightly to the material; covalent attachment via various complementary functional derivatization, e.g., carbodiimide coupling of amines on medical device 10 to carboxyls on fibers 22; ionic derivatization via chemical modification to produce strong electrostatic interaction; and coordination chemistry to bond layer 20 to, metal via modification with thiols or phenanthrolines.

Figures 8A, 8B:
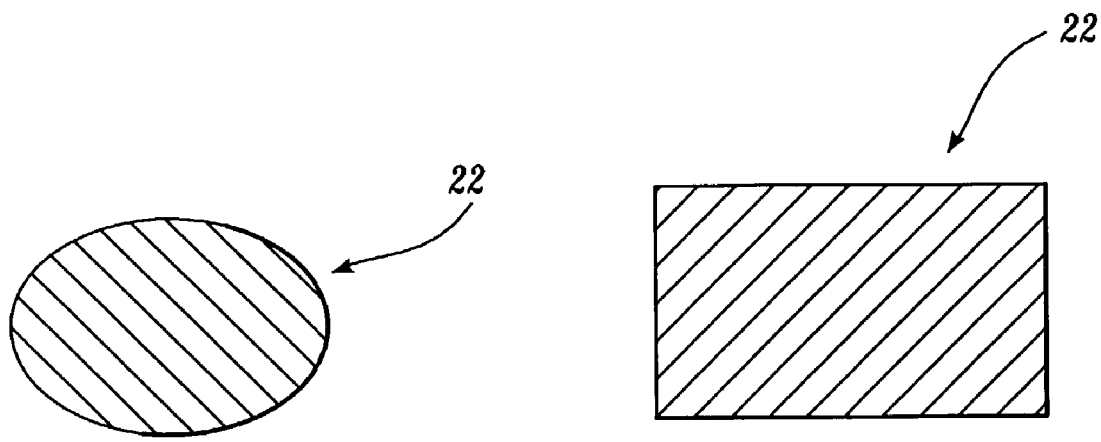
FIG. 8A shows a cross-sectional view of a fiber useful in the practice of the present invention, the cross-section is oval in shape and the plane of the cross-section is perpendicular to the long axis of the fiber.
FIG. 8B shows a rectangular cross section of a fiber useful in the practice of the present invention, the cross-section is rectangular in shape and the plane of the cross-section is perpendicular to the long axis of the fiber.
Figure 8C:
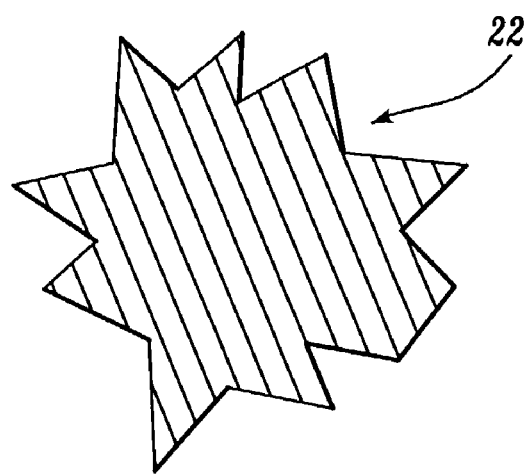
FIG. 8C shows an irregularly-shaped cross section of a fiber useful in the practice of the present invention, the cross-section is irregular in shape and the plane of the cross-section is perpendicular to the long axis of the fiber.

Fibers 22 are typically circular in cross section, but may have any cross-sectional configuration, such as oval (FIG. 8A), rectangular (FIG. 8B), or an irregular configuration, such as the irregular, cross-sectional configuration shown in FIG. 8C. In this context, it is understood that the plane of the cross-section is perpendicular to the longitudinal axis of fiber 22.

Figure 9:
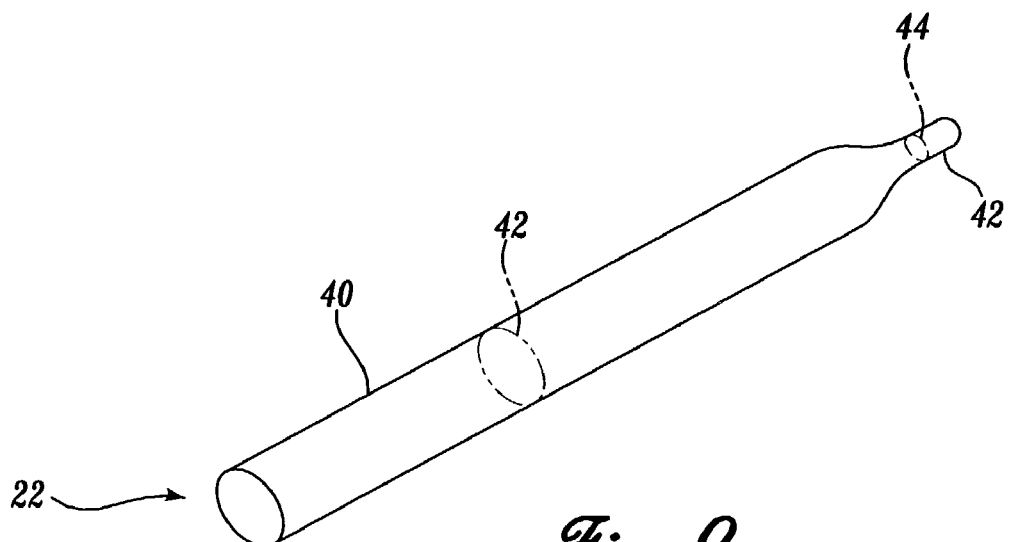
FIG. 9 shows a fiber having one portion having a maximum diameter of at least five micrometers.

In some embodiments, individual fibers 22 do not have a uniform cross-sectional diameter along their entire length, although all fibers 22 useful in the practice of the present invention include at least one portion having a maximum diameter of at least 5 µm. Thus, for example, in the embodiment shown in FIG. 9, fiber 22 includes a first portion 40 having a first diameter 42 and a second portion 44 having a second diameter 46, second diameter 46 having a smaller value than the value of first diameter 42. The value of first diameter 42 is at least 5 µm, and first portion 40 extends for greater than 90% of the length of fiber 22.

Figure 10:
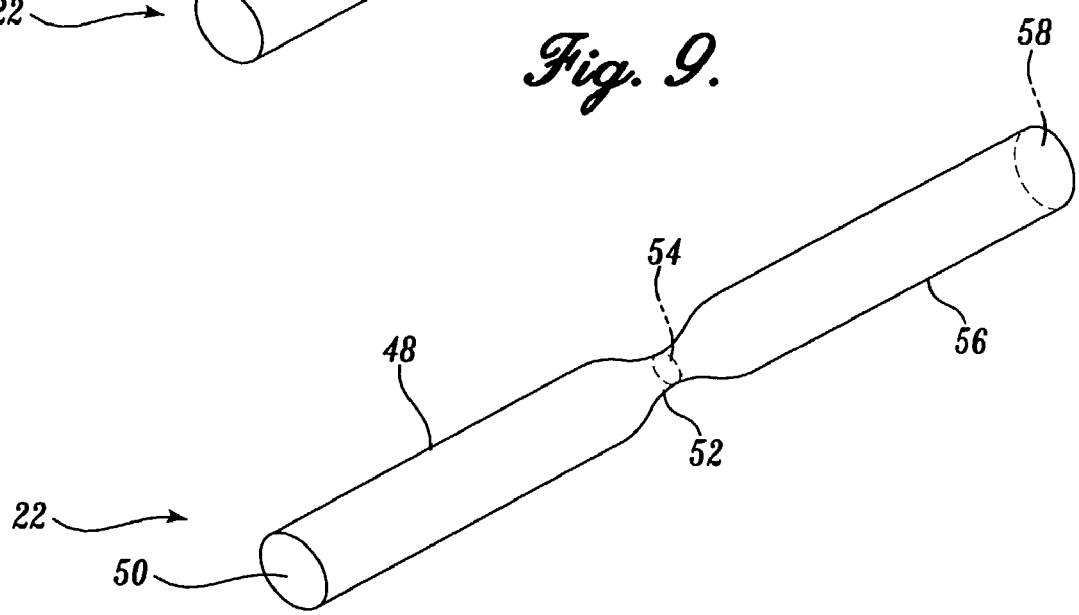
FIG. 10 shows a fiber having two portions, each having a maximum diameter of at least five micrometers.

In some embodiments of medical device 10, individual fibers 22 include at least two portions each having a maximum diameter of at least five micrometers, wherein the portions cumulatively extend for greater than 75% of the length of fiber 22. Thus, for example, in the embodiment shown in FIG. 10, fiber 22 includes a first portion 48 having a first diameter 50, a second portion 52 having a second diameter 54, and a third portion 56 having a third diameter 58. First diameter 50 and third diameter 58 are each at least 5 µm, and first portion 48 and third portion 56 cumulatively extend for greater than 90% of the length of fiber 22.

Typically the value of the Young's modulus of layer 20 is less than 1.0 GPa (less than 0.5 GPa in some embodiments), and is within about plus or minus 35% of the value of the Young's modulus of the tissue surrounding layer 20 after implantation. In some embodiments, the value of the Young's modulus of layer 20 is within about plus or minus 20% of the value of the Young's modulus of the tissue surrounding layer 20 after implantation. Table 1 shows representative values for the Young's modulus of various animal tissues and their primary constituents. The values were obtained from Skalak, R. and Chien, S.: *Handbook of Bioengineering*, New York: McGraw-Hill Book Co., 1987.

TABLE 1

Values for Young's modulus of various animal tissues and their constituents

| | MODULUS (GPA) |
|---|---|
| TISSUE | |
| Bone (cortical) | 6.9-27.4 |
| Tendon | 0.70 |
| Muscle fascia | 0.34 |
| Ligament nuchae (mostly elastin) | 0.0075 |
| Skin | 0.035 |
| Vessel | 0.001 |
| Nerve | 0.007 |
| CONSTITUENTS | |
| Collagen | 1.00 |
| Elastin | 0.0004 |

While not wishing to be bound by theory, it is believed that the foreign body reaction at the site of implantation is reduced, or eliminated, by utilizing, at the interface between implanted medical device 10 and the surrounding tissue (especially soft tissue, such as muscle or skin), fibers 22 that have a Young's modulus value identical to, or within 35% plus or minus of, the Young's modulus value of the tissue into which medical device 10 is implanted.

Fibers 22 can be formed by any art-recognized technique, such as, but not limited to: melt blowing, hot extrusion, solvent spinning, thermally-induced gelation, solvent exchange, freeze drying and post extrusion of both monofilament and multifilament structures. In the technique of melt blowing, dope is extruded through a series of small diameter orifices into a high velocity air stream flowing generally parallel to extruded fibers 22. The high velocity air draws or stretches fibers 22 as they cool. The stretching serves two purposes: it causes some degree of longitudinal molecular orientation and reduces the ultimate fiber diameter. Melt blowing has been extensively used since the 1970s to form fibers from molten synthetic polymers, such as polypropylene. Exemplary patents relating to melt blowing are Weber et al., U.S. Pat. No. 3,959,421, Milligan et al., U.S. Pat. No. 5,075,068, and U.S. Pat. Nos. 5,628,941; 5,601,771; 5,601,767; 4,416,698; 4,246,221 and 4,196,282. Melt-blowing typically produces fibers 22 having a diameter less than 10 µm.

In the technique of electrospinning, electrostatic forces are used to draw fine jets of liquid, such as a polymer solution.

See, Taylor, G. I., *Proc. R. Soc. London*, Ser A, 313:453 (1969). When a polymer solution that is held by its surface tension at the end opening of a capillary tube is subjected to an electric field, charge is induced at the liquid surface. Mutual charge repulsion causes a force directed opposite to the surface tension. When the electric field intensity is sufficiently strong, forces on the surface of the solution at the tip of the capillary overcome the surface tension, the surface elongates, and makes a fine jet in the direction of the applied field (perpendicular to the liquid surface). As the jet travels towards the ground terminal of the applied voltage, usually connected to a plate, screen, or rotating mandrel positioned at least a few centimeters beneath the nozzle, it crystallizes, forming fibers 22 that collect on the plate, screen, or mandrel. Fibers as small as 50 nm [Dosli, J. and Reneker, D. H., "Electrospinning process and applications of electrospun fibers" *J. Electrostatics*, 35:151-160 (1995)] in diameter with at least 50:1 length:diameter ratios have been fabricated using the electrospinning technique [Zarkoob, S., et al., "Structure and morphology of nano electrospun silk fibers" *Proceedings of the American Chemical Society* (ACS) Meeting, (1998)]. Electrospinning is generally described in Dosli, J. and Reneker, D. H., supra.

Fibers 22 can be made from any suitable material, or mixture of materials. Representative examples of synthetic polymers useful for making fibers 22 include, but are not limited to: silicones, carbonized polyurethane, nylon, polypropylene, polyethylene, polyurethane, polyester, polytetrafluoroethylene (PTFE), poly(lactic acid), poly(glycolic acid), polystyrene, polycarbonate, polyethylene glycol (PEG), fluoropolymers, poly(galactic acid), polyethylene terephthalate (PET), poly(dioxanone), poly(trimethylene carbonate) copolymers, poly (ε-caprolactone) homopolymers and copolymers, polyanhydrides, polyorthoesters, and copolymers of any of the foregoing. Representative examples of natural polymers useful for making fibers 22 include, collagen, elastin, proteins, carbohydrates and glycosaminoglycans. Moreover, layer 20 can include more than one type of fiber 22, the different fiber 22 types being made from different materials and/or having different physical properties, such as different diameters or lengths. For example, layer 20 can include polyester fibers 22 and polyurethane fibers 22.

Representative examples of medical devices 10 include, but are not limited to: prosthetic devices (such as artificial hip joints, artificial ligaments, artificial tendons and artificial knee joints), cardiovascular devices (such as vascular grafts, artificial heart valves and stents), drug delivery devices (e.g., implantable devices that release one or more drugs over a desired time period), skin substitutes (such as dermal and epidermal scaffolds), scaffolds that support tissue growth (in such anatomical structures as bone, tooth, nerves, pancreas, eye and muscle), implantable biosensors (such as those used to monitor the level of drugs within a living body, or the level of blood glucose in a diabetic patient) and percutaneous devices (such as catheters) that penetrate the skin and link a living body to a medical device, such as a kidney dialysis machine. Some medical devices 10 are completely implanted into an animal body (i.e., entire device 10 is implanted within an animal body), while some medical devices 10 are partially implanted into an animal body (i.e., only part of device 10 is implanted within an animal body, the remainder of device 10 being located outside of the body). Examples of partially implanted medical devices 10 include catheters and skin substitutes. Examples of medical devices 10 that are completely implanted into a living body include stents and artificial hip joints. Some medical devices 10 are used as a framework upon which to grow animal cells and/or tissues either in vivo or ex vivo.

In another aspect, the present invention provides methods for manufacturing medical devices 10, the methods including the steps of: (a) applying layer 20 comprising a plurality of fibers 22 to at least one surface of medical device 10; and (b) matching the value of the Young's modulus of layer 20 to +/−35% of the value of the Young's modulus of an animal tissue. It is understood that step (b) can occur before, during, after or overlapping with step (a). For example, the manufacturer can determine the tissue, or tissues, into which medical device 10 will be implanted, and then apply to at least one surface of medical device 10 a layer having a Young's modulus having a value that is within plus or minus 35% of the value of the Young's modulus of the animal tissue. In some embodiments of the methods of the invention, layer 20 has a Young's modulus value that is within plus or minus 20% of the value of the Young's modulus of the animal tissue.

The properties of fibers 22 useful in the practice of the methods of the invention (and the materials from which fibers 22 are made) are the same as the properties (and materials) of fibers 22 useful in medical devices 10 of the invention, and are described supra. As discussed, supra, layer 20 of fibers 22 can be applied to the at least one surface of medical device 10 by any art-recognized method. For example, fibers 22 can be deposited directly onto medical device 10, or can be formed separately and then attached to medical device 10, for example by using an adhesive.

In the practice of the methods of the invention, the Young's modulus of layer 20 is matched to plus or minus 35% (in some embodiments to within plus or minus 20%) of the value of the Young's modulus of the animal tissue(s) into which medical device 10 will be implanted. Thus, for example, the value of the Young's modulus of layer 20 applied to at least one surface of artificial blood vessel 12 is within plus or minus 35% of the value of the Young's modulus of the vascular tissue into which vessel 12 will be implanted. Representative examples of values of the Young's modulus of various animal tissues (into which medical devices 10 of the invention can be implanted) are set forth in Table 1, supra. Representative examples of values of the Young's modulus of various materials that can be used to make fibers 22 useful in the devices and methods of the present invention are set forth in Table 2 below. Table 2 also sets forth, by way of non-limiting example, representative animal tissue each having a Young's modulus that is similar in value to the Young's modulus of one or more listed materials.

TABLE 2

| TISSUE | TISSUE MODULUS (GPa) (from Table 1) | CANDIDATE MATERIAL | CANDIDATE MATERIAL MODULUS (GPa) |
|---|---|---|---|
| Tendon | 0.7 | High density Polyethylene | 0.7-1.4 |
| Muscle fascia | 0.34 | Polytetrafluoroethylene | 0.41 |
| Ligament nuchae (mostly elastin) | 0.0075 | Polyurethane (Estane, BF Goodrich) | 0.0068 |
| Nerve | 0.007 | Polyurethane (Estane, BF Goodrich) | 0.0068 |
| Collagen | 1.00 | Polypropylene | 1.1-2.0 |

The following examples merely illustrate the best mode now contemplated for practicing the invention, but should not be construed to limit the invention.

Example 1

Effect of Fiber Diameter and Young's Modulus on Foreign Body Reaction

This example shows that: (1) as the Young's modulus (E) of synthetic polymer fibers 22 implanted into rats decreases, the threshold fiber 22 thickness at which capsule formation (a consequence of the foreign body reaction) is zero, or close to zero, increases; and (2) the fibrous capsule thickness for all fiber 22 diameters decreases as the value of the Young's modulus of fibers 22 decreases.

Fibers 22: Single fibers 22 of poly(ethylene) terephthalate (polyester) (Aldrich, Milwaukee, Wis.), poly(lactic acid) (Polysciences Inc., Warrington, Pa.), and polyurethane (Estane 58315, BF Goodrich, Cleveland, Ohio) of diameters 1 to 30 μm were prepared using a heat and draw method. The polymers were heated in a 50 mL beaker or small vial on a hot plate and then drawn around a sterile test tube mounted to the shaft of a motor-driven lab stirrer (700-5400, Barnant, Barrington, Ill.). The motor was operated at up to 10,000 rpm depending on the desired fiber 22 diameter. Fibers 22 were cut off the test tubes, mounted on sterile glass slides, and grouped into three diameter ranges: 1 to 5.99 μm, 6 to 10.99 μm, and 11 to 15 μm. Individual fibers 22 were then mounted parallel to each other on polycarbonate frames of outer dimensions 17.8 mm×12.7 mm and thickness 1.55 mm such that there were an average of 10 fibers 22 from each group on each frame (fiber-to-fiber spacing was approximately 300-400 μm). All frame edges were rounded so as to reduce stress concentrations in the soft tissue. Each frame had only one material type. A random ordering of diameters was used.

Cytotoxicity evaluations were conducted with an elution test (US Pharmacopoeia, Rockville, Md.) on extracts from fibers 22 using fetal foreskin fibroblasts (passage of 7 or less). Endotoxicity testing was conducted using the Limulus Amebocyte Lysate assay (Pyrotell, Associates of Cape Cod, Inc., Falmouth, Mass.). All samples demonstrated cytotoxicity test scores of 2 (mild reactivity) or less on the USP scale thus passed the test and did not contain unacceptable levels of leachable cytotoxic chemicals. All samples had endotoxin levels less than 0.06 EU/ml, thus were acceptable.

Animal Model and Surgical procedures: Animal care committee approval (May, 2000) was obtained for all procedures. NIH guidelines for the care and use of laboratory animals (NIH Publication #85-23 Rev. 1985) were observed. One frame was implanted in the lateral subcutaneous dorsum of each of 24 Sprague-Dawley rats (mass 300 to 400 g) over soft tissue distal to the shoulder. Six frames were implanted for each of the three polymers tested: poly(ethylene terephthalate), poly(lactic acid), and polyurethane. This location was used because it reduced the possibility that an animal access the site with its teeth post surgery. Animals were gas anesthetized with isofluorane and oxygen (~2.5-3.0%). Using an air-filled 10 cc syringe and 22 g needle, a subcutaneous air pocket was created in the connective tissue layer between the smooth muscle in the skin and underlying fascia. An incision was made at the anterior end of the pocket and the frame inserted. The incision was closed with staples (Vista 35R, 3M, St. Paul, Minn.) that were removed 5 to 7 d post surgery. Frames were left implanted for a 5 wk period.

Tissue fixation and processing: Animals were euthanized in a carbon dioxide chamber, then the frames and surrounding tissue up to and including the underlying skeletal muscle excised. Each sample was attached to a stainless steel screen at its in vivo dimensions with 'U'-shaped staples at the edges so as to reduce tissue shrinkage during fixation. Samples were fixed in 4% paraformaldehyde for 3 days (d) and then rinsed in phosphate buffered saline (PBS) for 1 to 2 d. They were then dehydrated in 100% ethanol and infiltrated overnight in a cold curing hydroxyethylmethacrylate resin (Technovit 8100, Electron Beam Sciences, Inc., Agawam, Mass.). Using a rotary microtome, 4 μm sections were cut in planes perpendicular to the fiber axes. Sections were mounted on glass slides and coverslipped using Permount (Fisher Scientific, Fair Lawn, N.J.), then stained using hematoxylin and eosin to visualize fibrous capsule thickness.

Quantitative Morphological Analysis: Fibrous capsule thickness was assessed using a digital imaging system (Optronics, Goleta, Calif.) on a light microscope (Microphot-SA, Nikon Inc., Melville, N.Y.). Images were taken of each fiber. Using image-processing software (Image-Pro, Media Cybernetics, Silver Springs, Md.), contours were drawn around the fibrous capsule and fiber 22 for each image. Tissue was considered part of the fibrous capsule if it met the following criteria: tissue was clearly disrupted; cell nuclei were deformed and formed around a fiber 22; and collagen fibers were formed around a fiber 22 rather than in long strands parallel to the skin surface. In some images, void regions of no tissue formed at the fiber-tissue boundary. Those regions were traced with another closed contour.

Fibrous capsule thickness was determined by the method of Sanders, J. E., Stiles, C. E., and Hayes, C. L., *Journal of Biomedical Materials Research*, 52 (1): 231-237 (2000), i.e., by first calculating the equivalent capsule radius assuming a circular cross-section capsule, $$\text{Equivalent capsule radius} = \frac{\sqrt{\text{Area within fibrous capsule contour-void area}}}{\pi}$$

and the fiber radius assuming a circular cross-section fiber, $$\text{Fiber radius} = \frac{\sqrt{\text{Fiber area}}}{\pi}$$

Then, $$\text{Fibrous capsule thickness} = \text{Equivalent capsule radius} - \text{Fiber radius}$$

Measurement of Tensile Properties of Fibers 22: To measure the tensile modulus of fibers 22, the following procedure was used. Fibers 22 of diameter 20 to 45 micrometers were fabricated using a heat and draw method (as described supra). Care was taken to ensure fibers 22 were of constant diameter along their length. Fibers 22 were positioned in a tensile testing system that held them vertically in air with a gauge length of 50 mm. Weights were added incrementally to the apparatus supporting the lower end of fiber 22, allowing 1 min for stabilization after each weight addition. Then the active length of fiber 22 was measured. Weights were added until fiber 22 failed, though only the initial linear portions of the bi-phasic curves were used to determine the Young's moduli. Only the initial portion was used because those stress levels were comparable to those expected to be experienced in vivo by implanted fibers 22. Three fibers 22 were tested for each of the three materials: poly(lactic acid) (PLA), polyethylene terephthalate (PET) and polyurethane (PU). The mean moduli values (best linear fit to all the data) were used to determine the moduli for each material.

Figure 11:
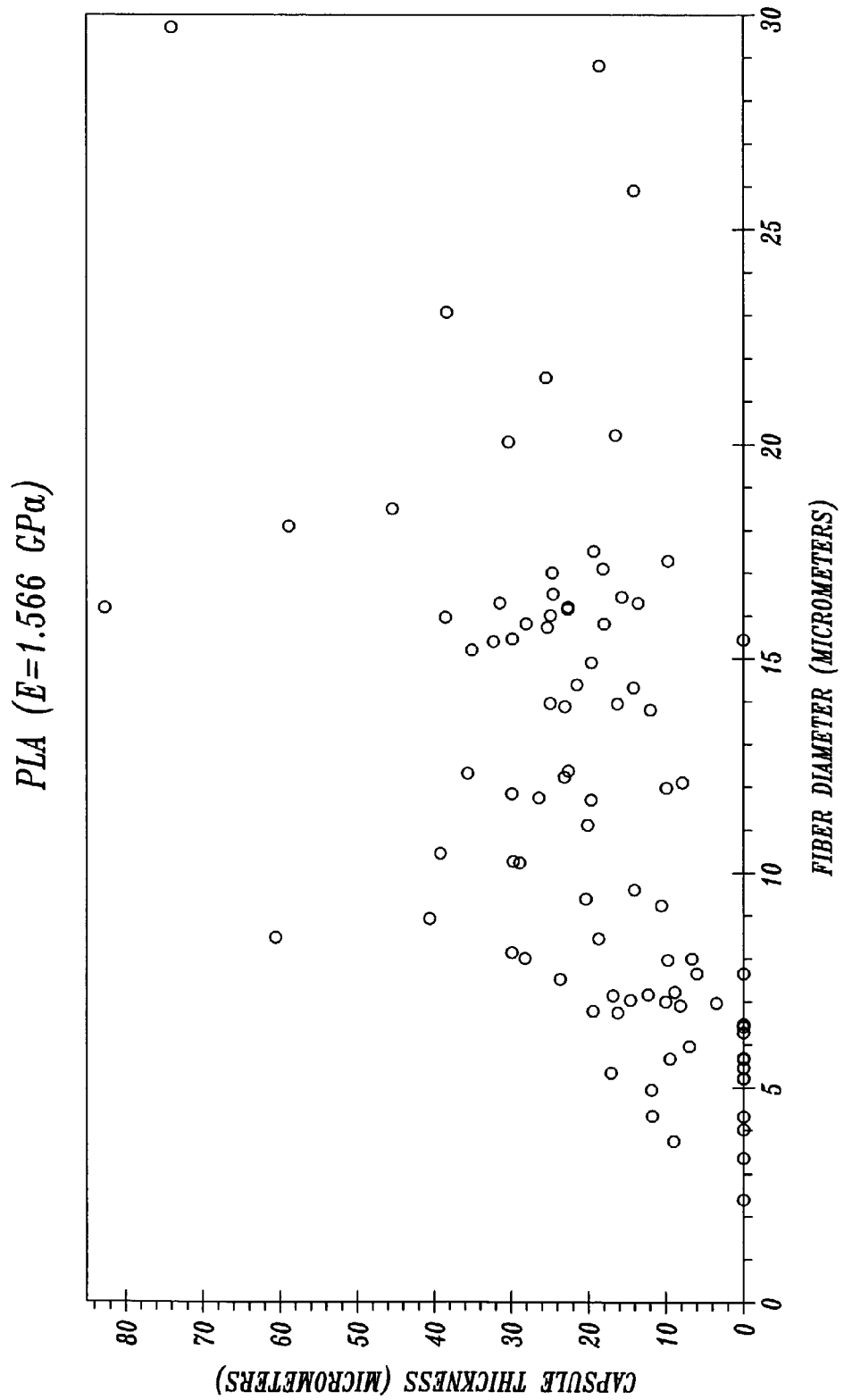
FIG. 11 shows a graph of capsule thickness versus fiber diameter for fibers made from poly(lactic acid), the value for Young's modulus (E) is shown at the top of the graph.
Figure 12:
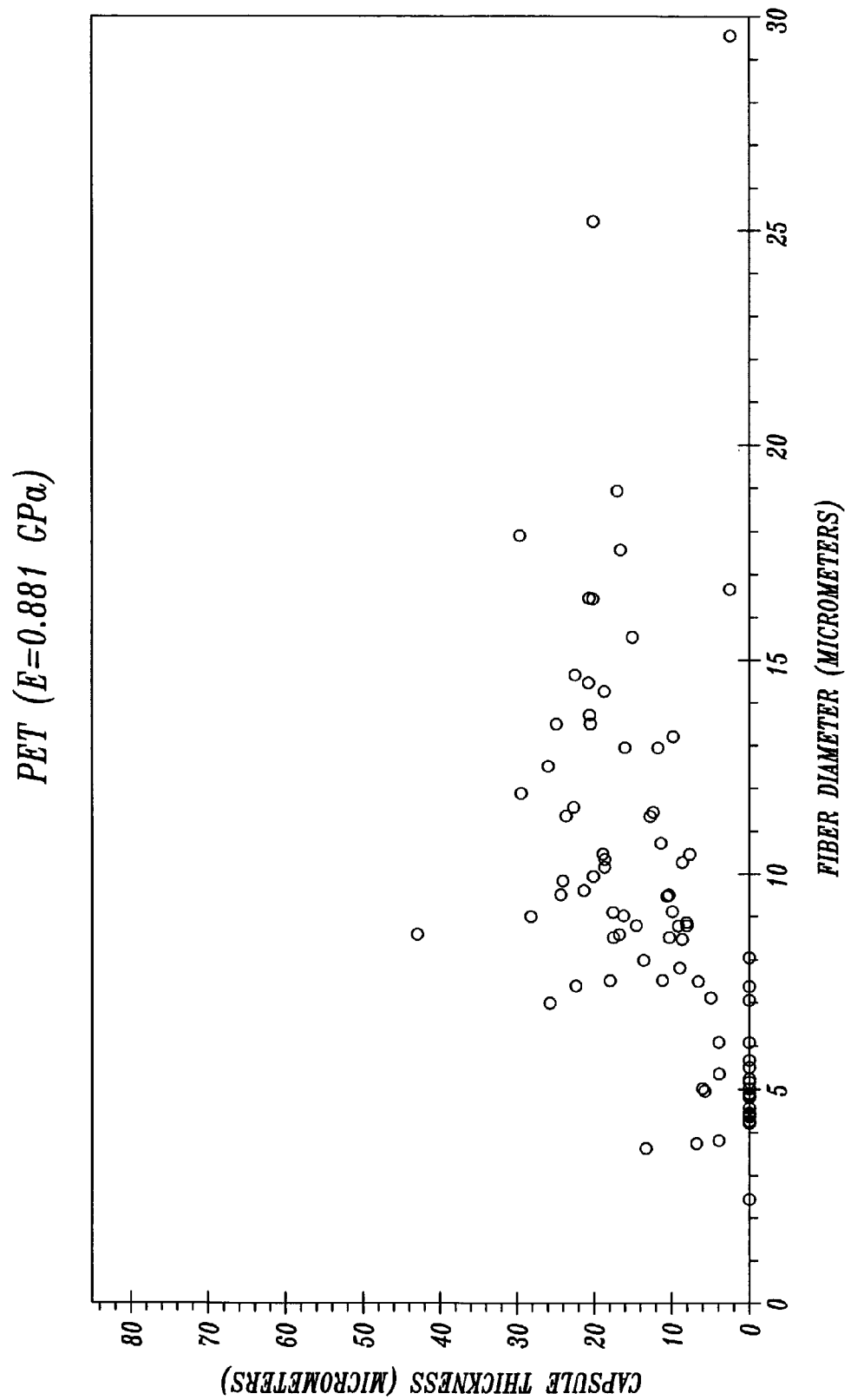
FIG. 12 shows a graph of capsule thickness versus fiber diameter for fibers made from polyethylene terephthalate, the value for Young's modulus (E) is shown at the top of the graph.
Figure 13:
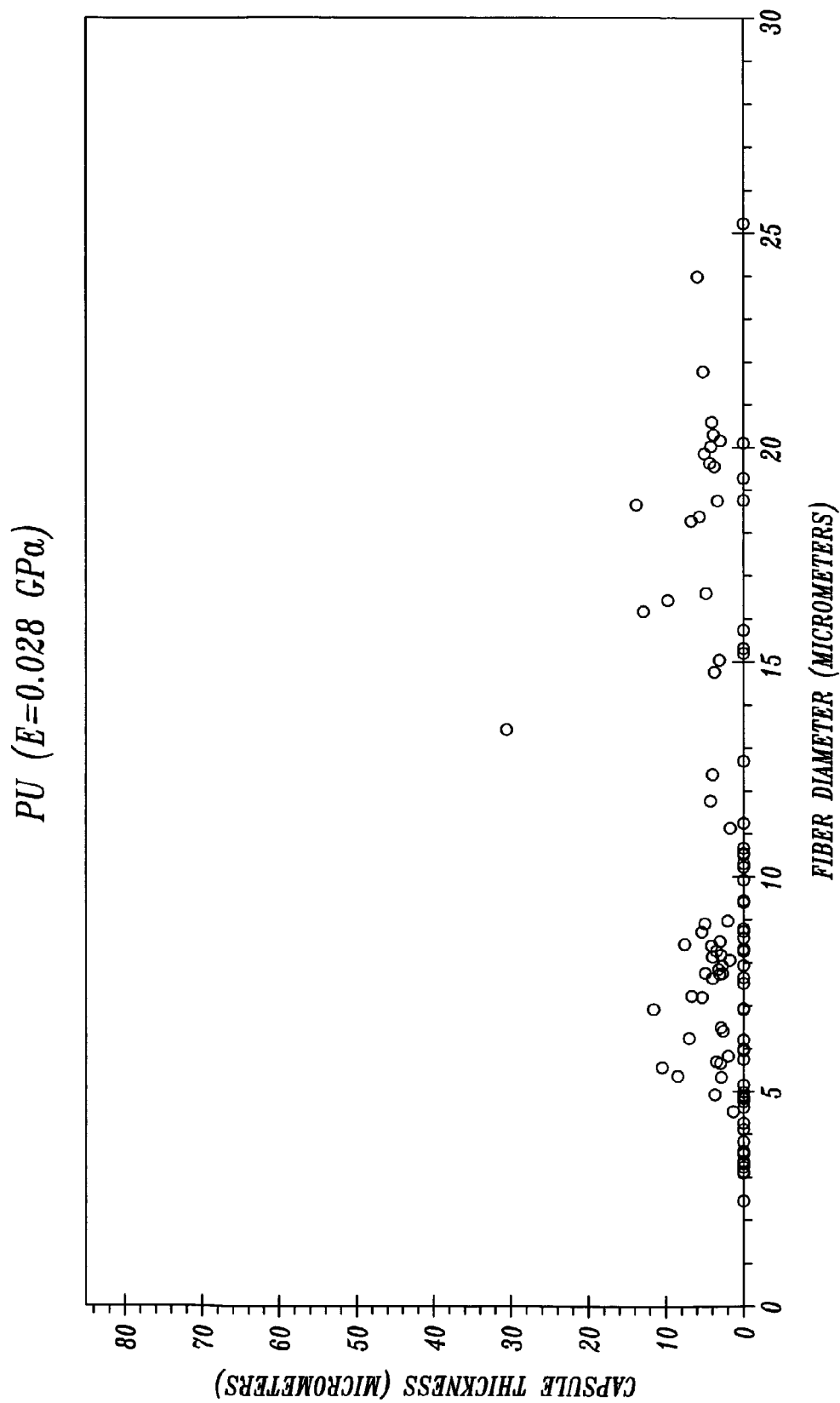
FIG. 13 shows a graph of capsule thickness versus fiber diameter for fibers made from polyurethane, the value for Young's modulus (E) is shown at the top of the graph.

Results: FIGS. 11, 12 and 13 show capsule thickness as a function of fiber diameter for fibers 22 made from poly(lactic acid) (PLA), polyethylene terephthalate (PET) and polyurethane (PU), respectively. The values for Young's modulus (E) for each fiber 22 type are shown at the top of each graph.

These data show that the threshold fiber diameter at which capsule thickness is near to zero increases as the fiber modulus (E) is reduced. Thus PLA (the highest modulus material) has the greatest capsule thickness and the smallest threshold acceptable fiber diameter (~6.4 micrometers). For PET (the intermediate modulus material), the capsule thickness is less and the threshold acceptable fiber diameter for no capsule is slightly greater (~7 micrometers). For PU (the lowest modulus material), the capsule thickness is very low and the threshold acceptable fiber diameter is high (~13 micrometers).

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An in vivo device, comprising:
   a medical device selected from a group consisting of an artificial ligament, an artificial tendon, an artificial knee joint, a vascular graft, an artificial heart valve, and a biosensor; and
   a layer of a plurality of randomly oriented fibers consisting of a single synthetic homopolymer fiber, substantially all of said plurality of fibers each comprising a portion having a maximum diameter of at least five micrometers,
   wherein substantially all of those fibers of the layer that contact at least one external surface of the medical device are directly, fully bonded to the entirety of the at least one external surface of the medical device, wherein said contact consists of said fibers and said external surface, and
   wherein the Young's modulus of the layer is no more than 1.00 GPa.

2. The device of claim 1, wherein substantially all of said plurality of fibers each comprise a portion having a maximum diameter of at least 6 micrometers.

3. The device of claim 1, wherein substantially all of said plurality of fibers each comprise a portion having a maximum diameter of at least 7 micrometers.

4. The device of claim 1, wherein substantially all of said plurality of fibers each comprise a portion having a maximum diameter of at least 10 micrometers.

5. The device of claim 1, wherein substantially all of said plurality of fibers each comprise a portion having a maximum diameter of at least 15 micrometers.

6. The device of claim 1, wherein said portion extends for greater than 75% of the length of said fiber.

7. The device of claim 1, wherein said portion extends for greater than 90% of the length of said fiber.

8. The device of claim 1, wherein said portion extends for greater than 98% of the length of said fiber.

9. The device of claim 1, wherein each of said fibers comprise at least two portions each having a maximum diameter of at least five micrometers, wherein said portions cumulatively extend for greater than 75% of the length of said fiber.

10. The device of claim 1, wherein each of said fibers comprise at least two portions each having a maximum diameter of at least five micrometers, wherein said portions cumulatively extend for greater than 90% of the length of said fiber.

11. The device of claim 1, wherein each of said fibers comprise at least two portions each having a maximum diameter of at least five micrometers, wherein said portions cumulatively extend for greater than 98% of the length of said fiber.

12. The device of claim 1, wherein said layer is a mesh.

13. The device of claim 1, further comprising multiple layers of fibers disposed on the entirety of at least one external surface of the medical device.

14. The device of claim 1, wherein said layer has a Young's modulus of no more than 0.5 GPa.

15. The device of claim 1, wherein said fibers comprise a material selected from the group consisting of silicones, carbonized polyurethane, nylon, polypropylene, polyethylene, polyurethane, polyester, polytetrafluoroethylene, poly(lactic acid), poly(glycolic acid), polystyrene, polycarbonate, polyethylene glycol, fluoropolymers, poly(galactic acid), polyethylene terephthalate, poly(dioxanone), poly($\epsilon$-caprolactone) homopolymers, polyanhydrides, and polyorthoesters.

16. The device of claim 1, wherein said plurality of fibers comprises a gradient of fiber diameters.

17. The device of claim 16, wherein said gradient includes a maximum fiber diameter and a minimum fiber diameter and at least 75% of fibers possessing said maximum diameter are disposed adjacent to said medical device external surface.

18. The device of claim 1, wherein said layer comprises pores defined by said fibers, said pores having a mean diameter of between 10 um and 120 um.

19. The device of claim 1, wherein said layer comprises pores defined by said fibers, said pores having a mean diameter of between 50 um and 100 um.

20. An in vivo device, comprising:
   a medical device selected from a group consisting of an artificial ligament, an artificial tendon, an artificial knee joint, a vascular graft, an artificial heart valve, and a biosensor; and
   a layer of a plurality of randomly oriented fibers consisting of a single synthetic homopolymer fiber, substantially all of said plurality of fibers each comprising a portion having a maximum diameter of at least five micrometers,
   wherein substantially all of those fibers of the layer that contact at least one external surface of the medical device are directly, fully bonded to the entirety of the at least one external surface of the medical device, wherein said contact consists of said fibers and said external surface,
   wherein the Young's modulus of the layer is no more than 1.00 GPa, and
   wherein said layer is a mesh.

* * * * *